US012547843B2

(12) United States Patent
Wang et al.

(10) Patent No.: US 12,547,843 B2
(45) Date of Patent: Feb. 10, 2026

(54) SYSTEMS AND METHODS FOR GENERALIZED ENTITY MATCHING

(71) Applicant: Recruit Co., Ltd., Tokyo (JP)

(72) Inventors: Jin Wang, Mountain View, CA (US);
Yuliang Li, Mountain View, CA (US);
Wataru Hirota, Mountain View, CA (US)

(73) Assignee: Recruit Co., Ltd., Tokyo (JP)

( * ) Notice: Subject to any disclaimer, the term of this patent is extended or adjusted under 35 U.S.C. 154(b) by 414 days.

(21) Appl. No.: 17/660,813

(22) Filed: Apr. 26, 2022

(65) Prior Publication Data

US 2023/0342558 A1    Oct. 26, 2023

(51) Int. Cl.
*G06F 40/40* (2020.01)
*G06F 40/205* (2020.01)
*G06F 40/284* (2020.01)

(52) U.S. Cl.
CPC .......... *G06F 40/40* (2020.01); *G06F 40/205* (2020.01); *G06F 40/284* (2020.01)

(58) Field of Classification Search
CPC .... G06F 40/137; G06F 40/194; G06F 40/205; G06F 40/216; G06F 40/284; G06F 40/295; G06F 40/30; G06F 40/40
See application file for complete search history.

(56) References Cited

U.S. PATENT DOCUMENTS

| | | | | |
|---|---|---|---|---|
| 2018/0349477 | A1* | 12/2018 | Jaech | G06F 16/9535 |
| 2021/0224237 | A1* | 7/2021 | Faruquie | G06N 5/01 |
| 2021/0287129 | A1* | 9/2021 | Saito | G06N 3/045 |
| 2021/0357375 | A1* | 11/2021 | Urdiales | G06N 3/08 |
| 2022/0318898 | A1* | 10/2022 | Pei | G06F 17/16 |
| 2023/0334070 | A1* | 10/2023 | Gullapudi | G06F 40/284 |

OTHER PUBLICATIONS

Merge and Label: A novel neural network architecture for nested NER (Year: 2019).*

* cited by examiner

*Primary Examiner* — Angela A Armstrong
(74) *Attorney, Agent, or Firm* — Finnegan, Henderson, Farabow, Garrett & Dunner, LLP (57) ABSTRACT

Disclosed embodiments relate to generalized entity matching. Techniques can include receiving a data pair of two entities that may be pre-processed to have parsable data structures, and serializing the data pair into a sequence of tokens based on data structure of each entity in the data pair. Techniques can further include encoding the serialized data pair to include topic attributes that may be mapped to data in the data pair and the topic of the mapped data matches the topic represented by topic attribute and the data in the data pair is concatenated. Techniques can further include pooling attributes in the data pair based on contextualized attributed representations of each encoded entity in the data pair and schema of each entity of the data pairs, where the contextual attribute representations are based on a first token of each encoded attribute in the sequence of tokens, and predicting matching labels between the data pairs based on pooled attributes.

17 Claims, 8 Drawing Sheets

Job Posting Schema (310)

```
{
  "id": <JobID>,
  "content": <LongJobDescription>,
  "info": {
    "title": <JobTitle>,
    "company": <CompanyName>,
    "country": <CountryName>,
    <More auxiliary information>
  }
}
```
311, 312

Resume Schema (320)

```
{
  "name": <CandidateName>,
  "email": <EmailAddress>,
  "contact": <AddressAndPhone>,
  "SUMMARY": <SummaryText>,
  "EDUCATION": [
    ("school": <SchoolName>,
     "major": <MajorName>,
     "date": <StartAndEndYear>),
    ...
  ],
  "EXPERIENCE": [
    ("company": <CompanyName1>,
     "work": [<Duty1>, <Duty2>],
     "date": <StartAndEndDate1>),
    ("company": <CompanyName2>,
     "work": [...],
     "date": <StartAndEndDate2>),
    ...
  ],
  "SKILLS": [<Skill1>, <Skill2>, ...]
}
```
321

SYSTEMS AND METHODS FOR GENERALIZED ENTITY MATCHING

BACKGROUND

Natural language processing systems are used to understand information records to perform various tasks, including finding matching records. Existing natural language processing systems can only perform identical matches or equality. Any other matches between heterogeneous records require a custom matching framework. Such custom matching frameworks need to be adjusted regularly for changes in data format or sources of data. There is a need for techniques and systems for customizable matching records tasks from different data sources and formats. Such techniques and systems can respond to the needs of modern natural language systems in a time and cost-effective manner.

SUMMARY

Certain embodiments of the present disclosure relate to a system for generalized entity matching. The system includes one or more processors executing processor-executable instructions stored in one or more memory devices to perform a method. The method may include receive a data pair of two entities, wherein the two entities of the data pair are pre-processed to have parsable data structures, serialize the data pair into a sequence of tokens, wherein serialization of the data pair is based on data structure of each entity in the data pair, encode the serialized data pair to include topic attributes, wherein the topic attributes map to data in the data pair, wherein topic of the mapped data matches the topic represented by topic attribute, wherein the data in the data pair is concatenated, pool attributes in the data pair based on contextualized attributed representations of each encoded entity in the data pair and schema of each entity of the data pairs, wherein the contextual attribute representations are based on a first token of each encoded attribute in the sequence of tokens, and predict matching labels between the data pairs based on pooled attributes.

According to some disclosed embodiments, the two entities of the data pair are pre-processed to have uniform data structures may include receive a plurality of records of the two entities, convert the plurality of records into hierarchical key-value data structure entities, remove duplicate entities using rule-based processors to generate unique entities, filter unique entities using rule-based heuristics to generate candidate pairs of entities.

According to some disclosed embodiments, receiving a data pair of two entities may include present a user interface to receive labels for a subset of candidate pairs, and generate negative pairs with no matching data to provide as an input to train a machine learning model used by generalized entity matching system.

According to some disclosed embodiments, serializing the data pair into a sequence of tokens may include access an entity of the two entities in the data pair, wherein the entity is a row in a table, add a first token to indicate beginning of the serialized entity, add iteratively second and third tokens for each column in the entity, wherein the iterative additions may include add the second token to indicate beginning of each column, wherein name of the column is concatenated to the second token, and add the third token to indicate beginning of value in the column, wherein the value in the column is concatenated to the third token, and add a fourth token to indicate the end of the entity.

According to some disclosed embodiments, serializing the data pair into a sequence of tokens may include access an entity of the two entities in the data pair, wherein the entity is a hierarchical key-value data structure, add a first tag to indicate beginning of the serialized entity, add recursively second and third columns for each level in the hierarchical key-value data structure, wherein recursive the additions may include add the second token to indicate the beginning of each level, wherein key of the level is concatenated to the second token, and add the third token to indicate beginning of value at the level, wherein the value at the level is concatenated to the third token, wherein concatenating the value may include concatenating a list of items representing value separated by a space, and add a fourth token to indicate the end of the entity.

According to some disclosed embodiments, serialize the data pair into a sequence of tokens may include concatenate two serialized entities of the data pair to generate a feature vector provided as input to an encoder to classify the feature vector.

According to some disclosed embodiments, serialize the data pair into a sequence of tokens may include provide each serialized entity of the two entities of the data pair as a feature vector to an encoder to classify the featured vector.

According to some disclosed embodiments, pool the data pair based on contextualized attributed representations of each encoded entity in the data pair and schema of each entity of the data pairs may include calculate an element-wise product between values of each attribute of the two entities, wherein the two entities share the same schema of attributes, and concatenate the element-wise product of each attribute.

According to some disclosed embodiments, pool the data pair based on contextualized attributed representations of each encoded entity in the data pair and schema of each entity of the data pairs may include apply max-pooling operator between values of the two entities to generate max matching scores of the attributes of the feature vector, wherein the two entities do not share the same schema of attributes, and concatenate the max matching scores of the attributes of the feature vector.

According to some disclosed embodiments, the method may further include provide an explanation of a match using attribute level explanations by determining euclidean distance between each attribute in first entity of the data pair to each attribute in second entity of the data pair, and listing the attributes which caused a match or no-match based on the euclidean distance between the attributes.

According to some disclosed embodiments, the method may further include provide an explanation of a match using word level explanations by retrieving attention weight at each layer, wherein the attention weight of each element is from source token in a first entity of the data pair to a target token in a second entity of the data pair, where attention output of each layer is a three-dimensional tensor, summing first two dimensions of three-dimensional tensor to generate an aggregate score for each token of the second entity, and identifying tokens of the second entity with an aggregate score in top quadrant.

According to some disclosed embodiments, predict matching labels between the data pairs based on pooled attributes may include filter the data pair with non-related entities, wherein the two entities in the data pair are different types of entities, or filter the data with non-matched entities, wherein the two entities in the data pair are same entity type.

Certain embodiments of the present disclosure relate to computer implemented method for predicting matching between any two entities utilizing a generalized entity matching system. The method may include receiving a data pair of two entities, wherein the two entities of the data pair are pre-processed to have parsable data structures, serializing the data pair into a sequence of tokens, wherein serialization of the data pair is based on data structure of each entity in the data pair, encoding the serialized data pair using external knowledge to include topic attributes, wherein the topic attributes map to data in the data pair, wherein topic of the mapped data matches the topic represented by topic attribute, wherein the data in the data pair is concatenated, pooling the data pair based on contextualized attributed representations of each encoded entity in the data pair and schema of each entity of the data pairs, wherein the contextual attribute representations are based on a first token of each encoded attribute in the sequence of toke, and predicting matching labels between the data pairs based on pooled attributes.

According to some disclosed embodiments, the two entities of the data pair are pre-processed to have uniform data structures may include receiving a plurality of records of the two entities, converting the plurality of records into hierarchical key-value data structure entities, removing duplicate entities using rule-based processors to generate unique entities, and filtering unique entities using rule-based heuristics to generate candidate pairs of entities.

According to some disclosed embodiments, pooling the data pair based on contextualized attributed representations of each encoded entity in the data pair and schema of each entity of the data pairs may include calculating an element-wise product between values of each attribute of the two entities, wherein the two entities share the same schema of attributes, and concatenating the element-wise product of each attribute.

According to some disclosed embodiments, pooling the data pair based on contextualized attributed representations of each encoded entity in the data pair and schema of each entity of the data pairs may include applying max-pooling operator between values of the two entities to generate max matching scores of the attributes of the feature vector, wherein the two entities do not share the same schema of attributes, concatenating the max matching scores of the attributes of the feature vector.

Certain embodiments of the present disclosure relate to a non-transitory computer readable medium including instructions that are executable by one or more processors to cause a system to perform a method for matching between any two entities. The method may include receiving a data pair of two entities, wherein the two entities of the data pair are pre-processed to have parsable data structures, serializing the data pair into a sequence of tokens, wherein serialization of the data pair is based on data structure of each entity in the data pair, encoding the serialized data pair using to include topic attributes, wherein the topic attributes map to data in the data pair, wherein topic of the mapped data matches the topic represented by topic attribute, wherein the data in the data pair is concatenated, pooling the data pair based on contextualized attributed representations of each encoded entity in the data pair and schema of each entity of the data pairs, wherein the contextual attribute representations are based on a first token of each encoded attribute in the sequence of token, and predicting matching labels between the data pairs based on pooled attributes.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In the following detailed description, numerous details are set forth to provide a thorough understanding of the disclosed example embodiments. It is understood by those skilled in the art that the principles of the example embodiments can be practiced without every specific detail. The embodiments disclosed are exemplary and are not intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for mining opinions to extract classification information based on limited training data using natural language techniques by computing systems.

The described embodiments provide a distinct advantage over existing natural language processing techniques. Unlike other processes, the entity matching techniques described in the disclosed embodiments can be used for multiple matching tasks with different types of entities. Additionally, the described embodiments transform the entity matching problem into a classification problem, allowing available transformer language models such as BERT for matching tasks. By using transformer language models, the embodiments disclosed herein can determine various relationships between entities. This can provide significant advantages in natural language processing systems that may need to respond to different individuals or questions that often say the same thing but differently. By allowing a generic matching framework using classification information, the embodiments disclosed herein can provide an improved ability to use natural language processing in various industries and particularized contexts without the need for time-consuming and expensive specialized matching frameworks built for only one matching task.

Figure 1:
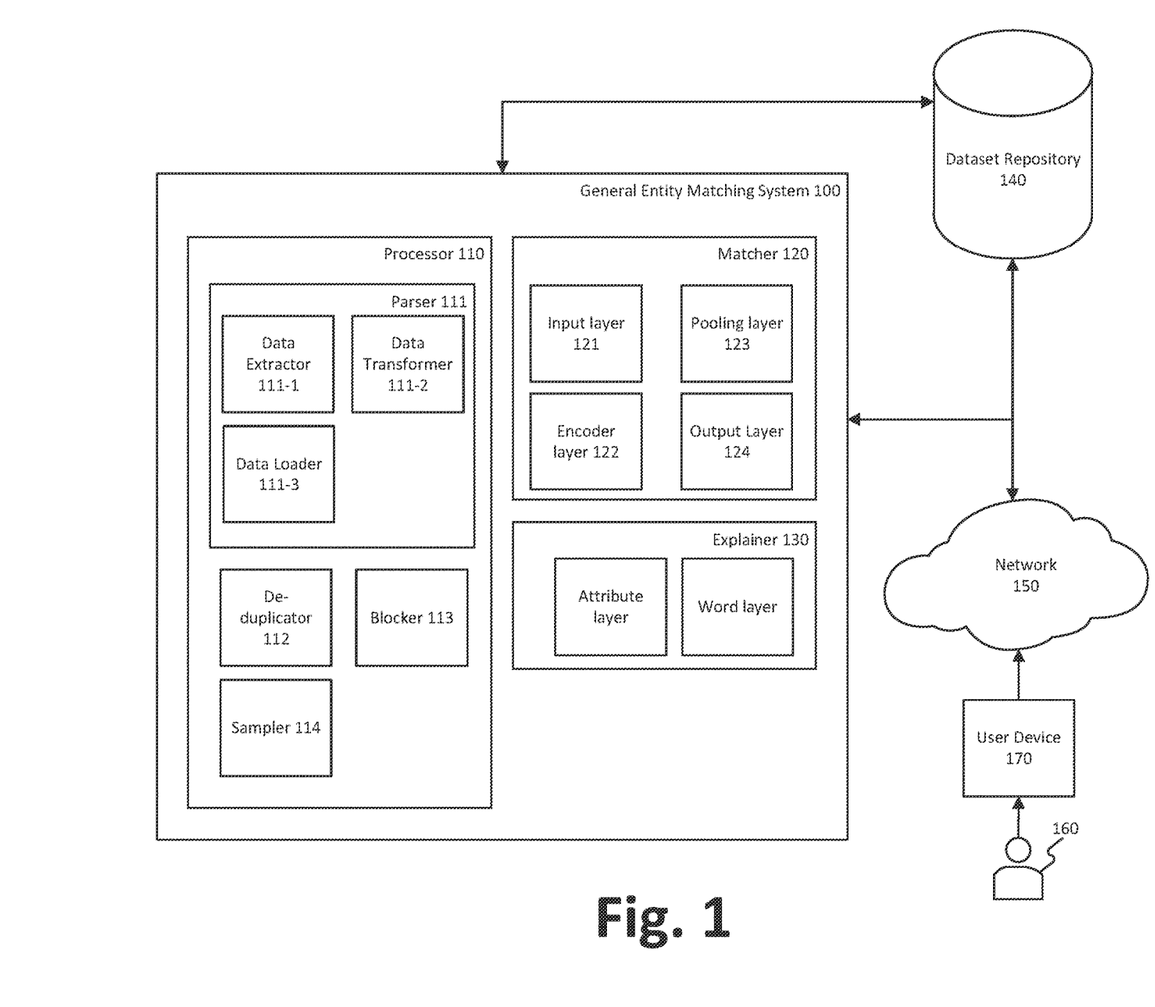
FIG. 1 is a block diagram showing exemplary components of a generalized entity matching system, consistent with embodiments of the present disclosure.

FIG. 1 is a block diagram showing exemplary components of a generalized entity matching system, consistent with embodiments of the present disclosure. The generalized entity matching system (GEM) 100 may comprise a processor 110 to create initial pairs of entities to check for a match by processing databases of entities of each type individually. In some embodiments, the candidate pairs can be supplied by user input, other systems, other data sources, or feedback from generalized entity matching system 100 or its components. As illustrated in FIG. 1, GEM 100 may include components such as processor 110, matcher 120, and explainer 130. GEM 100 may also include a data store such as dataset repository 140. GEM 100 uses matcher 120 to match entities of different entity types in dataset repository 140. In some embodiments, GEM 100 may use data stored in dataset repository 140 as input to train the machine learning (ML) model of matcher 120. In some embodiments, GEM 100 may use processor 110 and explainer 130 to pre-process entities matched by matcher 120 and post-process matched entities to explain the reason for a match, respectively.

Processor 110 makes it manageable for downstream modules such as matcher 120 to match a subset of pairs of entities of all possible pairs of available entities. Processor 110 may include multiple rule-based pre-processors to handle the input entities to create potential candidate pairs among various combinations of entities to find matched entries. As illustrated in FIG. 1, processor 110 may include parser 111, de-duplicator 112, blocker 113, and sampler 114.

Parser 111 helps in converting entities into a machine-readable format. For example, parser 111 may convert job postings and candidates' resume entities in HTML and PDF formats to machine-readable JSON format, providing a hierarchical structure to the entity's content. Parser 111 does not modify the entity's content structure, such as the order of the entity's content or the content itself.

Parser 111 may use a rule-based processor to convert content in entities to a structured format. The hierarchical structure provided for entities processed by parser 111 may depend on the entity type. For example, resume data tends to have a known structure of experience, skills, education, section to convert to semi-structured JSON format data. Unlike resume entities, job postings usually have long text descriptions with minimal structure and end up in less structured JSON format data. Parser 111 may use an example template schema to convert an entity's content. In some embodiments, parser 111 may generate a schema based on the provided entities. Parser 111 may review multiple entities of the same type to determine the standard schema to convert the entities to semi-structured JSON format data. For example, parser 111 may determine the attributes to use as keys and hierarchical structure of JSON format data based on available entities and their content and order of the content. Examples of a job posting and resume converted using parser 111 to semi-structured JSON format data are described in FIG. 2 description below. Parser 111 may also help parse data of entities to identify spam entries. For example, parser 111 on finding an email ID formatted data for company name may consider the entity a spam entry and filter it from being considered for candidate pairs to be matched by matcher 120.

In some embodiments, parser 111 may retrieve data from a variety of data sources (e.g., external job postings on websites, job reviews on websites, and resume uploaded to job sites) and processes the data into entities so that they may be used with the remainder of generalized entity matching system (GEM) 100. Parser 111 may further include a data extractor 111-1, data transformer 111-2, and data loader 111-3 modules. Data extractor 111-1 and data transformer 111-2 may work together to generate the entities stored in dataset repository 140. Data transformer 111-2 may connect the disparate data extracted from data sources by data extractor 111-1 and store it in dataset repository 140.

Data extractor 111-1 retrieves data from different data sources, for example, job posting sites such as Indeed.com or Dice.com, job review sites such as glassdoor.com, social networks such as LinkedIn. Each of these data sources may represent a different type of data source. For example, a data source may be a database similar to dataset repository 140. A data source may represent structured data, such as resumes of candidates. In some embodiments, data sources may be flat files, such as job postings and job reviews. Further, data sources may contain overlapping or completely disparate data sets. In some embodiments, a data source may contain information about job posting while other data sources may contain salary information of the position advertised in the job posting and reviews by previous and current employers in a position similar to the one advertised in the job posting. Data extractor 111-1 may interact with the various data sources, retrieve the relevant data, and provide that data to the data transformer 111-2.

Data transformer 111-2 may receive data from data extractor 111-1 and process the data into standard formats. In some embodiments, data transformer 111-2 may normalize data such as dates, addresses, job titles. For example, a data source for job postings may include job titles as strings (for example, engineer, director, manager, etc.), while a data source for job reviews may store job titles as various levels (for example, L1, L2, etc.) within the organization. In this example, data transformer 111-2 may modify the data provided through data extractor 111-1 into a consistent format. Accordingly, data transformer 111-2 may effectively clean the data provided through data extractor 111-1 so that all of the data, although originating from a variety of sources, has a consistent format. In some embodiments, data transformer 111-2 may clean data by combining data from different sources. For example, job reviews data may include pay ranges for each position, but the job postings may not include the pay range. In the second example, data transformer 111-2 may include the missing pay ranges in the job posting entities generated by parsing web pages of job postings.

Moreover, data transformer 111-2 may extract additional data points from the data sent by data extractor 111-1. For example, data transformer 111-2 may determine if a job is a remote position by extracting separate data fields for job position location and company location. Data transformer 111-2 may also perform other linear and non-linear transformations and extractions on categorical and numerical data, such as normalization and demeaning. In some embodiments, data transformer 111-2 may anonymize data extracted by data extractor 111-1. Data transformer 111-2 may anonymize data to avoid private data from being used to train machine learning models in general entity matching system 100. Data transformer 111-2 may provide the transformed or extracted data to data loader 111-3. In some embodiments, data transformer 111-2 may store the transformed data in dataset repository 140 for later use by data loader 111-3 and other modules of processor 110.

Data loader 111-3 may receive the normalized data from data transformer 111-2. Data loader 111-3 may merge the data into varying formats depending on the specific requirements of GEM 100 and store the data in an appropriate storage mechanism such as dataset repository 140.

De-duplicator 112 helps remove duplicate entities from the dataset repository 140 to create candidate pairs 231. In an exemplary scenario for finding relevant jobs to recommend to a candidate, the GEM 100 may use de-duplicator 112 to remove copies of the same job posting uploaded to various websites from being considered different job postings. De-duplicator 112 uses a rule-based processor to remove duplicate copies of entities. Rule-based processors may include simple rules to find a matching text in a certain section of the entity's contents. For example, in the above described scenario of finding relevant jobs to recommend to a candidate, de-duplicator 112 may include a rule to find the company and job title in the document using keyword based search. The keyword search could look through a list of possible keywords. For example, de-duplicator 112 can identify the job position by searching for the keywords "role," "title," "job title," "position," "job position," etc. In another example, de-duplicator 112 may find a company's name by looking at the top of the job posting document or text in an address format indicating the company's address. De-duplicator 112 may combine text retrieved using multiple keywords and from specific positions in the entity's content to determine duplicate entities. For example, in the example scenario described above, company name or job title alone may not help identify duplicate entities but combined, they represent unique positions de-duplicator 112 can use to remove duplicate entities. In some embodiments, de-duplicator 112 may need to use more than two rule-based searches to identify the entities uniquely. For example, in the above exemplary scenario, as the same job position from a company may be available in multiple locations, location may need to be retrieved along with job title and company name to identify and eliminate duplicates.

In some embodiments, de-duplicator 112 may use an N-gram rule-based processor to identify duplicate entities. An N-gram processor may predict that a title is followed by the job title and use that to identify potential duplicate entries.

Blocker 113 may help block entity pairings that will never match. GEM 100 may allow user 160 to configure the blocking function of blocker 113 to limit the number of pairs of entities to be reviewed by matcher 120 for potential matching of entities. Blocking functions may be simple rule-based processors that are fast with a high recall rate and only avoid irrelevant matches. For example, in a scenario for finding matching jobs, blocker 113 may use a no match of "title" attribute values as a blocking function of blocker 113. Blocker 113 may use hierarchical key-value structures data output by parser 111 to retrieve "title" attribute values. In some embodiments, blocker 113 may be configured to include multiple blocking functions to refine further the pairs of entities sent to matcher 120 to predict potential matches. For example, blocker 113 may include a Q-gram blocking function to be applied after a "title" match rule-based blocker function to refine further the possible pairs of entities to share with matcher 120 to predict matches. Q-gram blocking function blocks entity pairs for refining the set of possible pairs for matching by allowing the approximate matching of two sequences in entities. The approximate matching of two sequences may include allowing the sequences to differ by a sub-sequence of length Q. If any two sequences of entities differ by more than a sub-sequence of length Q, then the pairing of the two entities is represented by two sequences is blocked from ever pairing. User 160 may configure GEM 100 to select and/or define blocking functions to include in blocker 113.

Sampler 114 may filter entity pairs not blocked by blocker 113. Sampler 114 may filter by matching content that may potentially not be considered. Sampler 114 may be configured by user 160 to select a subset of entities to provide input pairs to matcher 120. Configuration of sampler 114 may include a number of entity pairs of a certain to be considered by GEM 100 or the number of matches expected to be identified by GEM 100. For example, in a scenario for matching jobs entities to resume entities to recommend related jobs to a candidate, user 160 may configure sampler 114 to include a minimum and a maximum number of job recommendations to a candidate, causing sampler 114 to pick some of the possible pairs of job and resume entities for matching by matcher 120. Sampler 114 may allow multiple filters to be stacked together. In the above example scenario, user 160 may further configure to set the minimum and maximum values for different size companies (e.g., large corporations, startups).

Matcher 120 is a machine learning (ML) model that may aid in identifying matching entities. Matcher 120 may retrieve candidate pairs of entities present in dataset repository 140 for finding the best matching entities. Matcher 120 may find the best matching entities by scoring each pair of entities and picking a top percentage of entity pairs with the highest match score. In some embodiments, matcher 120 may pick matched entities by dropping entity pairs with a low match score.

As illustrated in FIG. 1, matcher 120 may include an input layer 121 to set up the data for predicting matched entity pairs. Matcher 120 may also include an encoding layer 122, pooling layer 123, output layer 124 to process input entity pairs, filter out relevant information, and present match results, respectively. A detailed description of various architectures of the ML model of matcher 120 is presented in FIG. 4 description below.

Matcher 120 may be a known language model, for example, BERT, Long Former, etc., with modifications. Modification may include modification of existing layers, for example, encoding layer 122 may include a classifier to further structure the minimally structured job entities with long strings. A detailed description of the functionality of the modified encoding layer 122 is presented in FIG. 4 description below. In some embodiments, modifications may include the addition of new layers, such as pooling layer 123, to reduce the number of possible matches and predict the best matches.

Matcher 120 may access entity pairs from dataset repository 140 to predict matches. In some embodiments, matcher 120 may directly receive entity pairs to predict matches. User 160 may supply entity pairs to matcher 120 over network 150, or processor 110 may supply entity pairs to predict a match. In some embodiments, matcher 120 may buffer a set of entity pairs before making a match prediction.

Dataset repository 140 can be a Relational Database Management System (RDBMS) (e.g., Oracle Database, Microsoft SQL Server, MySQL, PostgreSQL, or IBM DB2). An RDBMS can be designed to efficiently return data for an entire row, or record, from the database in as few operations as possible. An RDBMS can store data by serializing each row of data in a data structure. In an RDBMS, data associated with a record can be stored serially such that data associated with all categories of the record can be accessed in one operation. Moreover, an RDBMS can efficiently allow access to related records stored in disparate tables. For example, in an RDBMS, tables can be linked by a referential column, and the RDBMS can join tables together to retrieve data for a data structure. In some embodiments, the dataset repository 140 can be a non-relational database system (NRDBMS) (e.g., XML, Cassandra, CouchDB, MongoDB, Oracle NoSQL Database, FoundationDB, or Redis). A non-relational database system can store data using a variety of data structures such as, among others, a key-value store, a document store, a graph, and a tuple store. For example, a non-relational database using a document store could combine all of the data associated with a particular identifier into a single document encoded using XML. Dataset repository 140 can also be an in-memory database such as Memcached. In some embodiments, the contents of dataset repository 110 can exist both in a persistent storage database and in an in-memory database, such as is possible in Redis.

Generalized entity matching system (GEM) 100 can receive requests for predicting matches between entities over network 10. Network 150 can be a local network, Internet, or a cloud. User 160 can send requests for matching entities to generalized entity matching system 100 over network 150. User 160 can interact with GEM 100 over user device 170. User device 170 can be a variety of devices such as a tablet, laptop, or portable computer using a web browser or an installed application. User 160 sends matching request 180 over network 150 to generalized entity matching system 100 for predicting matches between entities.

The components of GEM 100 can run on a single computer or can be distributed across multiple computers or processors. The different components of GEM 100 can communicate over a network (e.g., LAN or WAN) 150 or the Internet. In some embodiments, each component can run on multiple computer instances or processors. The instances of each component of the GEM 100 can be a part of a connected network such as a cloud network (e.g., Amazon AWS, Microsoft Azure, Google Cloud). In some embodiments, some, or all, of the components of GEM 100 are executed in virtualized environments such as a hypervisor or virtual machine.

Figure 2:
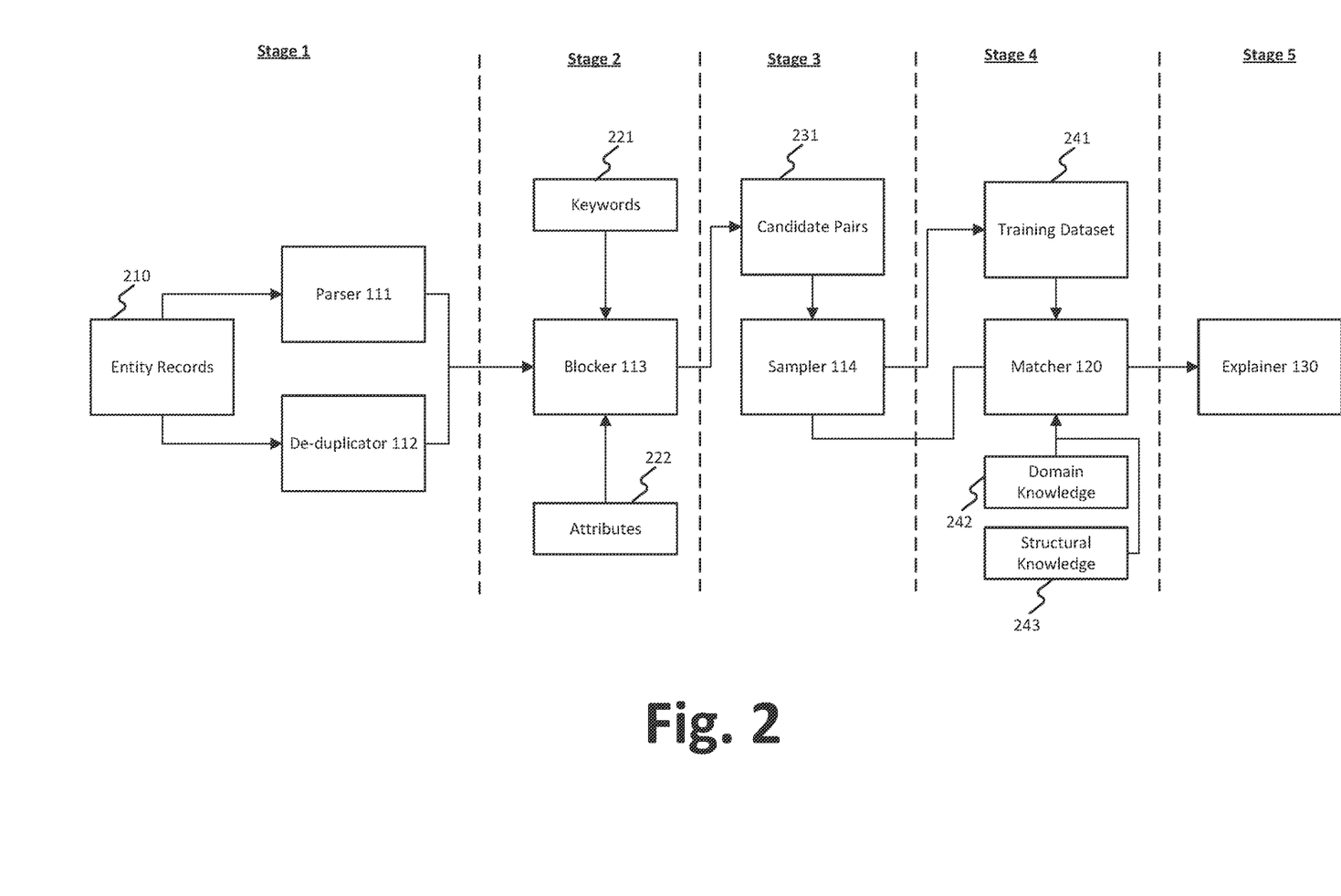
FIG. 2 is a flow diagram of an exemplary generalized entity matching system, consistent with embodiments of the present disclosure.

FIG. 2 is a flow diagram of exemplary generalized entity matching system 100 of FIG. 1, consistent with embodiments of the present disclosure. Generalized entity matching system (GEM) 100 matching prediction includes the transformation of data by going through various stages 1 through 5 and may include back propagating the transformed data for further training of matcher 120.

In stage 1, GEM 100 may receive and cleanup records of entities for processing by GEM 100. GEM 100 may receive the entity records over a network from user 160. In some embodiments, entity records 210 may include labeled and unlabeled data. Labeled data may be data from previous iterations.

GEM 100 cleanups the received entity records 210 using parser 111 and de-duplicator 112 tools. Parser 111 and de-duplicator 112 can aid in cleaning up entity records 210 by converting content in entity records 210 into a uniform format using semi-structured data structures while maintaining the structure of content, such as order of content. GEM 100 can simultaneously parse entity records 210 using parser 111 and determine duplicate entities among the entity records 210 using de-duplicator 112.

In stage 2, GEM 100 may further clean the list of entity records 210 for finding matched entities. GEM 100 may use blocker 113 to identify pairs of entities from entity records 210 to consider to find matched entities. Blocker 113 determines candidate pairs 231 using keywords 221 and attributes 222. A user (e.g., user 160 of FIG. 1) may configure keywords 221 and attributes 222 to find pairs of entities in entity records 210 to generate candidate pairs 231.

Blocker 113 may use keywords 221 to find candidate pairs 231 of entities to identify matched entities. Blocker 113 may look up keywords in pairs of entities and pair them if both entities include the keyword in the information in the entities. Blocker 113 may use this technique when pairing different types of entities. For example, GEM 100 identifies jobs to recommend to a candidate by matching job and resume type entities may lookup matching keywords such as job title to pair entities and find matching entity pairs. In the exemplary scenario, a search for job title listed in the job posting as a keyword in the resume may match the previous job titles creating a candidate pair between job and resume entity to include in candidate pairs 231. Blocker 113 may use keyword based matching to identify candidate pairs of the same type entities. For example, a job title in a job entity may be used as a keyword to find other job entities with the same job title as candidate pairs.

In some embodiments, blocker 113 may use attributes 222 to find candidate pairs 231 by searching matching attributes between entities. Blocker 113 may use this technique when pairing the same type of entities. For example, GEM 100 configured to find matching job postings may consider two job entities with no matching attributes to be not a good candidate pair to include in candidate pairs 231. In some embodiments, blocker 113 may first check for the presence of certain attributes for matching entities. For example, GEM 100 configured to match two job postings may check the presence of "Job Title" in both job entities before conducting further matches. In some embodiments, blocker 113 may use both keyword and attribute-based search together to identify matching entities.

In stage 3, GEM 100 may further limit the entities among available entity records 210 to find matched entities. GEM 100 uses a sampler 114 to filter pairs of entities provided to matcher 120 of stage 4 to find matched entity pairs. For example, GEM 100 used for finding jobs to recommend to candidates may use sampler 114 to limit entity pairs of job postings and candidate resume determined by blocker 113 to a maximum of 10 entities so as to limit the number of jobs recommended at once. In another example, sampler 114 may filter entity pairs to limit the number of job postings recommended to a candidate in each geographical region. Sampler 114 may select some candidate pairs 231 based on configurations provided by a user (e.g., user 160 of FIG. 1) of GEM 100.

In stage 4, GEM 100 may find matching entities using matcher 120. In some embodiments, GEM 100 may train matcher 120 using a training data set 241 to help improve in identifying matched entities. Matcher 120 receives additional information, such as domain knowledge 242 and structural knowledge 243, to help determine matched entities. Matcher 120 may use domain knowledge 242 and structural knowledge 243 to process the content of entities in candidate pairs 231 by classifying the entities in candidate pairs 231. Structural knowledge 243 can help apply tokens to classify portions of the entity's content, which may be considered long textual descriptions by parser 111. For example, matcher 120 finding matching job entities to recommend to a candidate may use structural knowledge about job posting to transform long text in a job description and associate with different attributes such as duties, responsibilities, skills, benefits, etc., to help with matching entities using the attributes. In another scenario, matcher 120 may use domain knowledge to understand that job titles "principal engineer" and "engineer fellow" mean the same, and the entities can be matched.

In stage 5, GEM 100 may explain the results of matched entities using explainer 130. Explainer 130 may review the matched entities identified by matcher 120 to explain the result of matched pair of entities. Explainer 130 may provide explanations by highlighting portions in entities' content that are important to find matches to the entity. In some embodiments, explainer 130 may provide a tabular representation showing distances between attributes associated with matched entities highlighting the farthest apart and closes attributes of matched entities.

Explainer 130 may present output by highlighting text or in a tabular manner using word-level and attribute-level explanation techniques to explain the matched entities. Explainer 130 may provide word-level explanations by retrieving the attention weight of tokens in serialized entities passed through different layers of a machine learning model (e.g., transformer language model such as BERT) in matcher 120. Explainer 130 may calculate the attention weight between a source token in a first serialized entity to a target token in a second serialized entity of the matched entity pair. The attention output of each layer may be a three-dimensional tensor. Explainer 130 may highlight text in an entity representing a token if its aggregate score falls within the top quadrant. Explainer 130 may calculate the aggregate scores of tokens by summing at least the first two dimensions of a three-dimensional tensor. The aggregate scores may be used to identify reasons for a match by finding tokens with the highest aggregate scores.

Explainer 130 may present explanations in a tabular manner using attribute level explanations showing the distance between various attributes in a first and second entity of a matched entity pair determined by matcher 120. Explainer may determine the euclidean distance between attributes of entities identified by processor 110 to prepare a table output. The distance may be used to identify reasons for no-match by finding attributes with the most distance.

Figure 3:
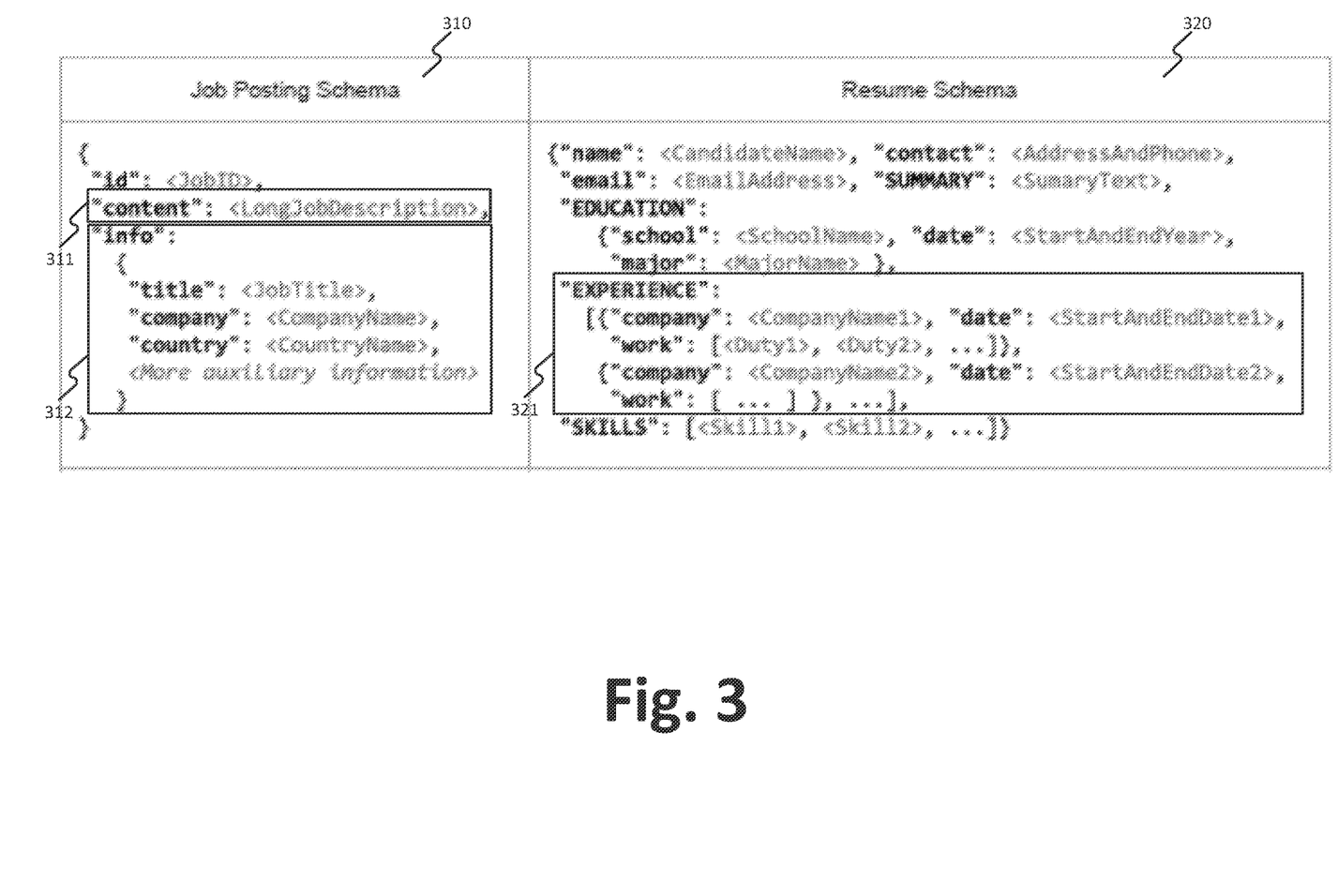
FIG. 3 shows exemplary data structures of entities generated by generalized entity matching system, consistent with embodiments of the present disclosure.

FIG. 3 shows exemplary data structures of entities generated by generalized entity matching system 100 of FIG. 1, consistent with embodiments of the present disclosure. As illustrated in FIG. 3, job posting schema 310 and resume schema 320 represent semi-structured representations of job and resume entities. Parser 111 may parse HTML and PDF documents listing job posting and resume to generate semi-structured JSON representations of job and resume entities. Semi-structured JSON representations 310 and 320 include various attributes presented as keywords mapped to portions of the information in documents of entities as values of the keys. For example, attributes 311 and 312 in job posting schema 310 entity map to different information present in a job posting document representing a job posting entity. Values may include additional mappings between more attributes represented keys and mapped values. Attribute 312 includes "title," "company," and "country" as additional attributes. In some embodiments, a portion of information in a document representing an entity can only be used as a single long value mapped to the attribute. For example, job description information may be a long textual description represented "content" key mapped to value "<LongJobDescription>."

GEM 100 may use an existing schema representing an entity type to convert entity documents, such as an HTML page of a job posting or PDF file of a resume, into JSON formatted entities (e.g., Job posting schema 310 and Resume schema 320). GEM 100 may request parser 111 to help convert entity documents to JSON formatted entities. A user (e.g., user 160 of FIG. 1) may provide the schema for converting to JSON formatted entities. In some embodiments, GEM 100 may parse entity documents to automatically determine schema for preparing JSON formatted entities. GEM 100 may consider multiple entity documents of the same type with varying information to prepare one generic schema for each entity type.

JSON formatted entities may organize information in entity documents in hierarchically structured entities. For example, attribute 311 maps one key "content" to one value "<LongJobDescription>." but attribute 312 maps key "info" to a set of key-value pairs. In some embodiments, an attribute may map to multiple sets of key-value pairs. For example, attribute 321 includes key "Experience" mapped to a list of key-value pair sets, each with the same set of keys repeated for different values. The hierarchical nature of JSON formatted entities allows one entity to be part of another entity by linking an entire entity to a key in another entity.

Figure 4:
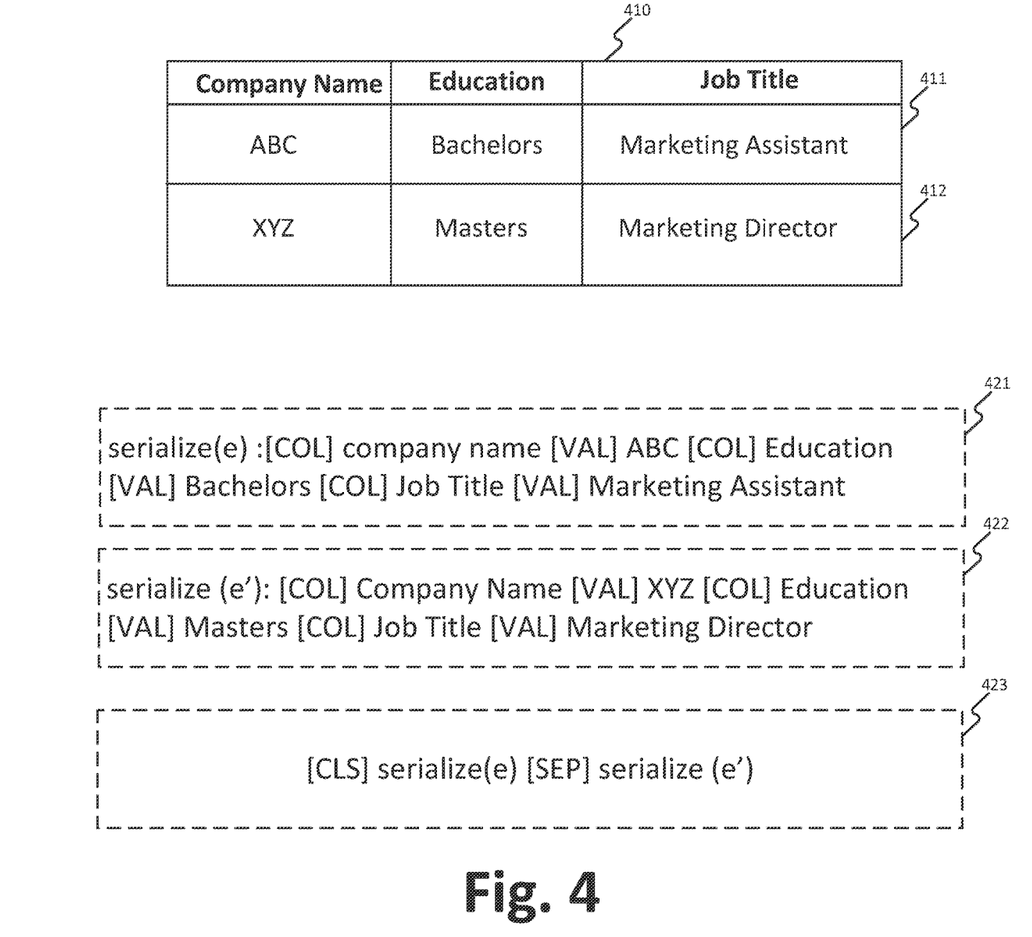
FIG. 4 shows exemplary serialization of data generated by generalized entity matching system, consistent with embodiments of the present disclosure.

FIG. 4 shows exemplary serialization of data generated by generalized entity matching system 100 of FIG. 1, consistent with embodiments of the present disclosure. Structured and semi-structured data that are present in form tables (e.g., table 410 of FIG. 4) and JSON documents (Job Posting Schema 310 of FIG. 3) are serialized by input layer 121 (as shown in FIG. 1) of matcher 120 (as shown in FIG. 1). Input layer 121 may include a serializer (e.g., serializer 610 of FIG. 6) to serialize structured data to strings. As illustrated in FIG. 4, job posting entities represented as table rows 411 and 422 may be serialized to serialized entities 421 and 422.

GEM 100 may convert each row of a table representing an entity by using specialized tokens, such as "[COL]" and "[VAL]" to represent the column name and the value of the row in a specific column. Serializer module requests for the column name and value and creates an entry of the form "[COL]<column name>[VAL]<column value>." GEM 100 may iteratively serialize each row's column and append them together to form a serialized entity. For example, serialized entities 421 and 422 represent rows 411 and 412 of table 410 with all column names and values in columns appended together using special tokens "[COL]" and "[VAL]."

GEM 100 may serialize pairs of entities to identify matched entity pairs. GEM 100 may serialize multiple entities by using special tokens "[CLS]" and "[SEP]" as shown in serialized entity pair 423. As illustrated in entity pair 423, GEM 100 adds "[CLS]" token to the beginning of a series of tokens and "[SEP]" token to separate the serialized entities. GEM 100 may use a space or a comma character as a separator when serializing a list of entries associated with an attribute. For example, attribute 321 (as shown in FIG. 3) includes a mapping between a key, and a list of values is serialized with a "[VAL]" token followed by a list of serialized key-value pairs.

GEM 100 may use the same "[COL]" token when serializing an attribute in a semi-structured JSON formatted entity or use a different token. For example, attribute 311 may be serialized as "[ATTR]content [VAL]<LongJobDescription>."

Figure 5:
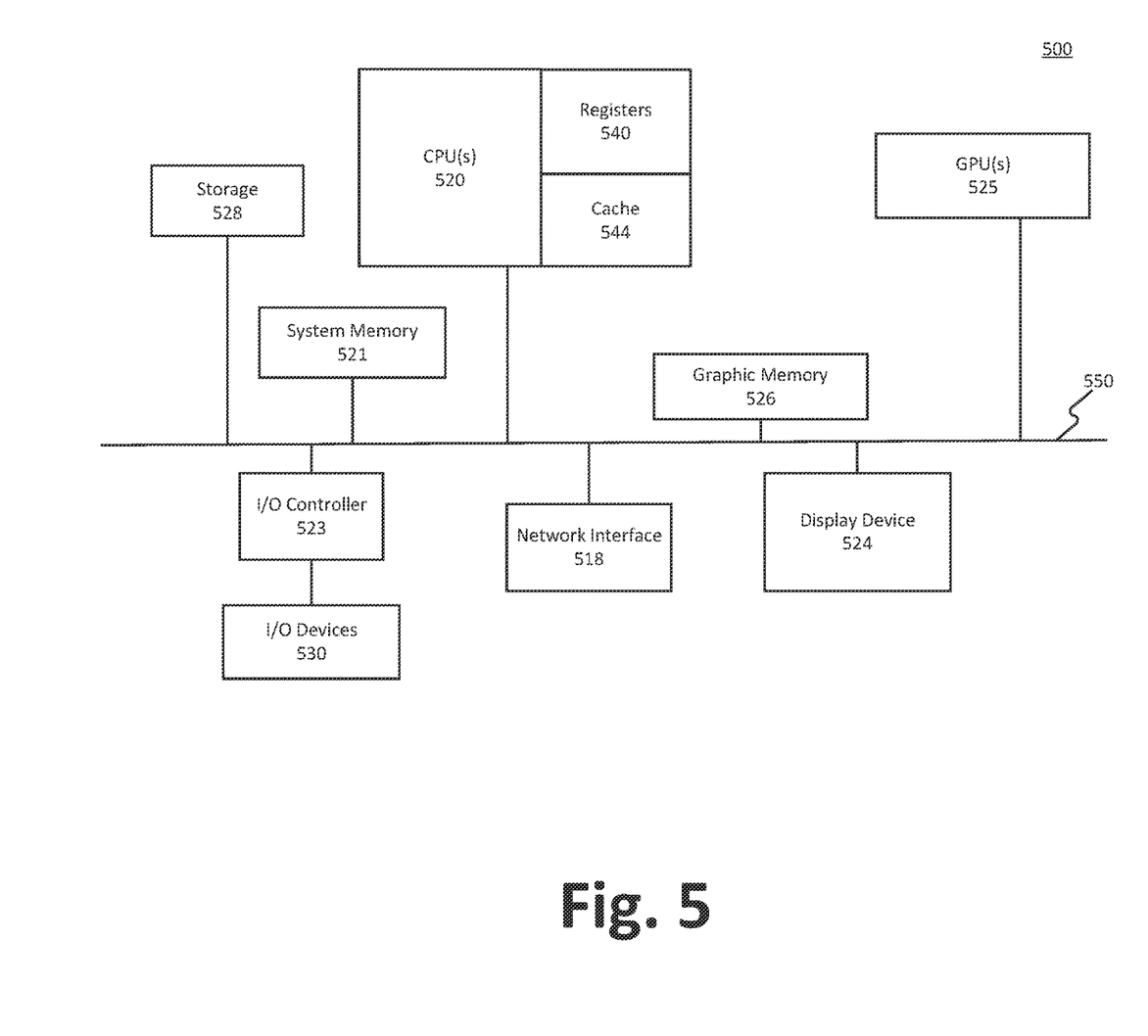
FIG. 5 is a block diagram of an exemplary computing device, consistent with embodiments of the present disclosure.

FIG. 5 is a block diagram of an exemplary computing device 500, consistent with embodiments of the present disclosure. In some embodiments, computing device 500 can be a specialized server providing the functionality described herein. In some embodiments, components of generalized entity matching system (GEM) 100, such as processor 110, matcher 120, explainer 130, and dataset repository 140 of FIG. 1, can be implemented using the computing device 500 or multiple computing devices 500 operating in parallel. Further, the computing device 500 can be a second device providing the functionality described herein or receiving information from a server to provide at least some of the described functionality. Moreover, the computing device 500 can be an additional device or devices that store or provide data consistent with embodiments of the present disclosure and, in some embodiments, computing device 500 can be a virtualized computing device such as a virtual machine, multiple virtual machines, or a hypervisor.

Computing device 500 can include one or more central processing units (CPUs) 520 and a system memory 521. Computing device 500 can also include one or more graphics processing units (GPUs) 525 and graphic memory 526. In some embodiments, computing device 500 can be a headless computing device that does not include GPU(s) 525 or graphic memory 526.

CPUs 520 can be single or multiple microprocessors, field-programmable gate arrays, or digital signal processors capable of executing sets of instructions stored in a memory (e.g., system memory 521), a cache (e.g., cache 541), or a register (e.g., one of registers 540). CPUs 520 can contain one or more registers (e.g., registers 540) for storing various types of data including, inter alia, data, instructions, floating-point values, conditional values, memory addresses for locations in memory (e.g., system memory 521 or graphic memory 526), pointers and counters. CPU registers 540 can include special-purpose registers used to store data associated with executing instructions such as an instruction pointer, an instruction counter, or a memory stack pointer. System memory 521 can include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 521 can be one or more memory chips capable of storing data and allowing direct access by CPUs 520. System memory 521 can be any type of random-access memory (RAM), or other available memory chip capable of operating as described herein.

CPUs 520 can communicate with system memory 521 via a system interface 550, sometimes referred to as a bus. In embodiments that include GPUs 525, GPUs 525 can be any type of specialized circuitry that can manipulate and alter memory (e.g., graphic memory 526) to provide or accelerate the creation of images. GPUs 525 can have a highly parallel structure optimized for processing large, parallel blocks of graphical data more efficiently than general-purpose CPUs 520. Furthermore, the functionality of GPUs 525 can be included in a chipset of a special purpose processing unit or a co-processor.

CPUs 520 can execute programming instructions stored in system memory 521 or other memory, operate on data stored in memory (e.g., system memory 521), and communicate with GPUs 525 through the system interface 550, which bridges communication between the various components of the computing device 500. In some embodiments, CPUs 520, GPUs 525, system interface 550, or any combination thereof, are integrated into a single chipset or processing unit. GPUs 525 can execute sets of instructions stored in memory (e.g., system memory 521), to manipulate graphical data stored in system memory 521 or graphic memory 526. For example, CPUs 520 can provide instructions to GPUs 525, and GPUs 525 can process the instructions to render graphics data stored in the graphic memory 526. Graphic memory 526 can be any memory space accessible by GPUs 525, including local memory, system memory, on-chip memories, and hard disk. GPUs 525 can enable displaying of graphical data stored in graphic memory 526 on display device 524 or can process graphical information and provide that information to connected devices through network interface 518 or I/O devices 530.

Computing device 500 can include a display device 524 and input/output (I/O) devices 530 (e.g., a keyboard, a mouse, or a pointing device) connected to I/O controller 523. I/O controller 523 can communicate with the other components of computing device 500 via system interface 550. It should now be appreciated that CPUs 520 can also communicate with system memory 521 and other devices in manners other than through system interface 550, such as through serial communication or direct point-to-point communication. Similarly, GPUs 525 can communicate with graphic memory 526 and other devices in ways other than system interface 550. In addition to receiving input, CPUs 520 can provide output via I/O devices 530 (e.g., through a printer, speakers, bone conduction, or other output devices).

Furthermore, the computing device 500 can include a network interface 518 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 518 can comprise a built-in network adapter, network interface card, PCMCIA network card, card bus network adapter, wireless network adapter, USB network adapter, modem, or any other device suitable for interfacing the computing device 600 to any type of network capable of communication and performing the operations described herein.

Figure 6A:
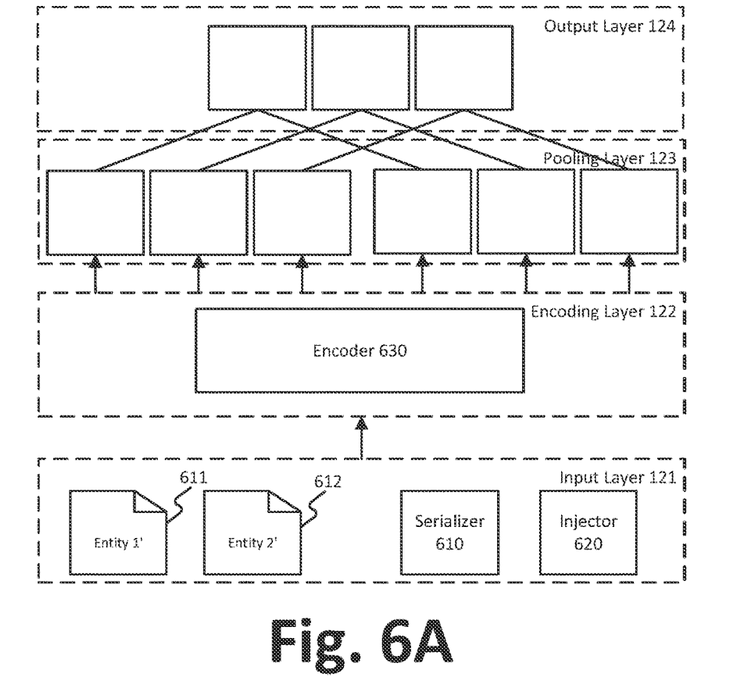
FIGS. 6A-6B show exemplary networks of layers of machine learning model used by generalized entity matching system, consistent with embodiments of the present disclosure.
Figure 6B:
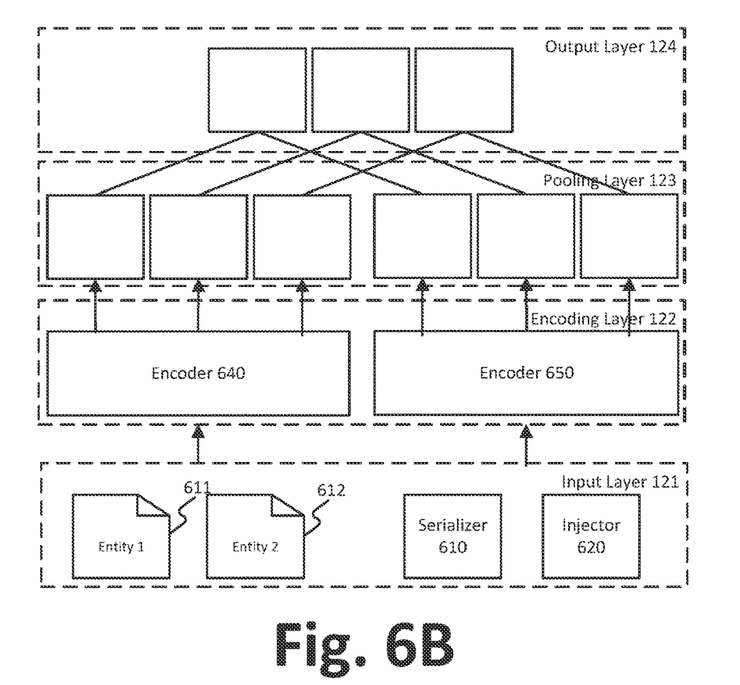

FIGS. 6A-6B show exemplary networks of layers of machine learning model used by generalized entity matching system (GEM) 100 of FIG. 1, consistent with embodiments of the present disclosure. GEM 100 may use a machine learning (ML) model including layers: input layer 121, encoding layer 122, pooling layer 123, and output layer 124. GEM 100 may use different network architectures such as sequenced architecture (as shown in FIG. 6A) and siamese architecture (as shown in FIG. 6B) to identify matched entity pairs.

As illustrated in FIGS. 6A and 6B, input layer 121 includes serializer 610 to serialize entities 611 and 612 already available in input layer 121. Serializer 610 may transform entities 611 and 612 into a string. A detailed description of serializing entities is provided above with respect to FIG. 4. Input layer 121 may also include injector 620 to input external knowledge into ML Model used by GEM 100 to find matches between entity pairs with different formats including different information. External knowledge is especially helpful when the input entities lack enough structure to predict matched entity pairs. For example, job posting entities include long job descriptions represented in JSON structure, such as job posting schema 310 (as shown in FIG. 3) with "<LongJobDescription>" with no structure. Injector 620 allows the injection of domain knowledge (e.g., domain knowledge 242 of FIG. 2) and structural knowledge (e.g., structural knowledge 243 of FIG. 2) to transform the unstructured and limited structured data to help in better matching the entities. GEM 100 may provide a user interface for a user (e.g., user 160 of FIG. 1) to provide external knowledge for use by ML model network to improve an entity's structure. GEM 100 may use external knowledge to classify sentences of information in an entity content. GEM 100 may include a classifier to classify each sentence in entity information using a topic label. GEM 100 may access a set of possible sentence topic labels, from a data repository, for example, dataset repository 140 (as shown in FIG. 1), to classify each sentence and provide structure to an entity's information. The sentence topic classification labels may include well known sections of entity information. For example, when processing job posting entities, sentence topic classifier labels may include the set {Qualification, Benefit, Duty, Time, Location, Company}, which are the most common sections of job posting entities. Sentence topic classifier labels may include the "None" label to apply to sentences that do not fall under the other known sections of an entity type. GEM 100 may remove sentences from entities when finding matched entities to save space and find matches efficiently. The sentence topic classifier labels help provide structure to an entity used by higher layers such as pooling layer 123 to help pool attributes representing different groupings of topic classifier labels.

Depending on the ML model network architecture, entities 611 and 612 may be supplied to encoding layer 122 in different manners. In a sequenced architecture shown in FIG. 6A, entities 610 and 620 are concatenated before they are supplied to an encoder (e.g., encoder 630) to encode a concatenated entity pair to generate vectors representing each token in a serialized entity. In a siamese architecture, as shown in FIG. 6B, entities 611 and 612 are supplied to encoders 640 and 650 individually to encode to generate independent vectors used by pooling layer 123.

Pooling layer 123 may help pool attributes to filter our non-matching entity pairs. Pooling layer 123 is a structure-aware layer that pools attributes present in serialized entities based on the alignment information of the entities. Alignment information may include the format of entities, entity types and their schema. Pooling layer 123 may match two entities with the same homogenous schema, for example, two job entities using pairwise similarity of the aligned attributes of the entities. The aligned attributes are used as features by a ML model of GEM 100 to match the entities. GEM 100 may match two entities $e_a$ and $e_b$ by taking vectors of information $v_i^a$ and $v_i^b$ representing values of aligned attributes $\{attr_1, \ldots, attr_n\}$ in the matching schema. Pooling layer 123 calculates the pooling score of the entities by performing an element-wise product (e.g., multiplication) between the two vectors for each attribute and concatenating the product vectors. The output of the pooling operation when using entities of a homogenous schema would be:

$$\text{Pooling\_homo}(e_a, e_b) = \oplus_{i \in [1,n]} v_i^a \odot v_i^b.$$

Pooling layer 123 may perform attribute-wise max-pooling when matching two entities with different schema. Attribute-wise max-pooling aids in finding the most relevant attributes in the entities. Pooling layer 123 max-pools attributes by calculating the maximum matching score for each vector representing each attribute in the first entity to a plurality of vectors representing a plurality of attributes in the second entity. For $attr_i$ in entity $e_a$ represented by vector $v_i^a$ the maximum distance is calculated by calculating distances to various vectors $v_j^b$ in entity $e_b$. Pooling layer 123 then concatenates all the matching scores to generate the pooling output as follows:

$$\text{Pooling\_heter}(e_a, e_b) = \oplus_{i \in [1,n]} \max_{j \in [1,m]} \left( v_i^a \odot v_j^b \right)$$

GEM 100 may provide output from pooling layer 123 to the output layer to predict labels for matches between entity pairs. Predicted labels can include "yes" or "no" to indicate pair entity match or related or not. In some embodiments, labels may indicate which portions of the entities match. For example, predicted labels may include attributes of the first entity that match the attributes of the second entity in an entity pair. In some embodiments, predicted labels may include names of matched entity pairs. In some embodiments, predicted labels may indicate how well the entity match each other. For example, predicted labels may be an integer in the range 1 to 5, indicating the level of match between entities. GEM 100 may allow configuration of output prediction labels by a user (e.g., user 160) through a user device 170.

Figure 7:
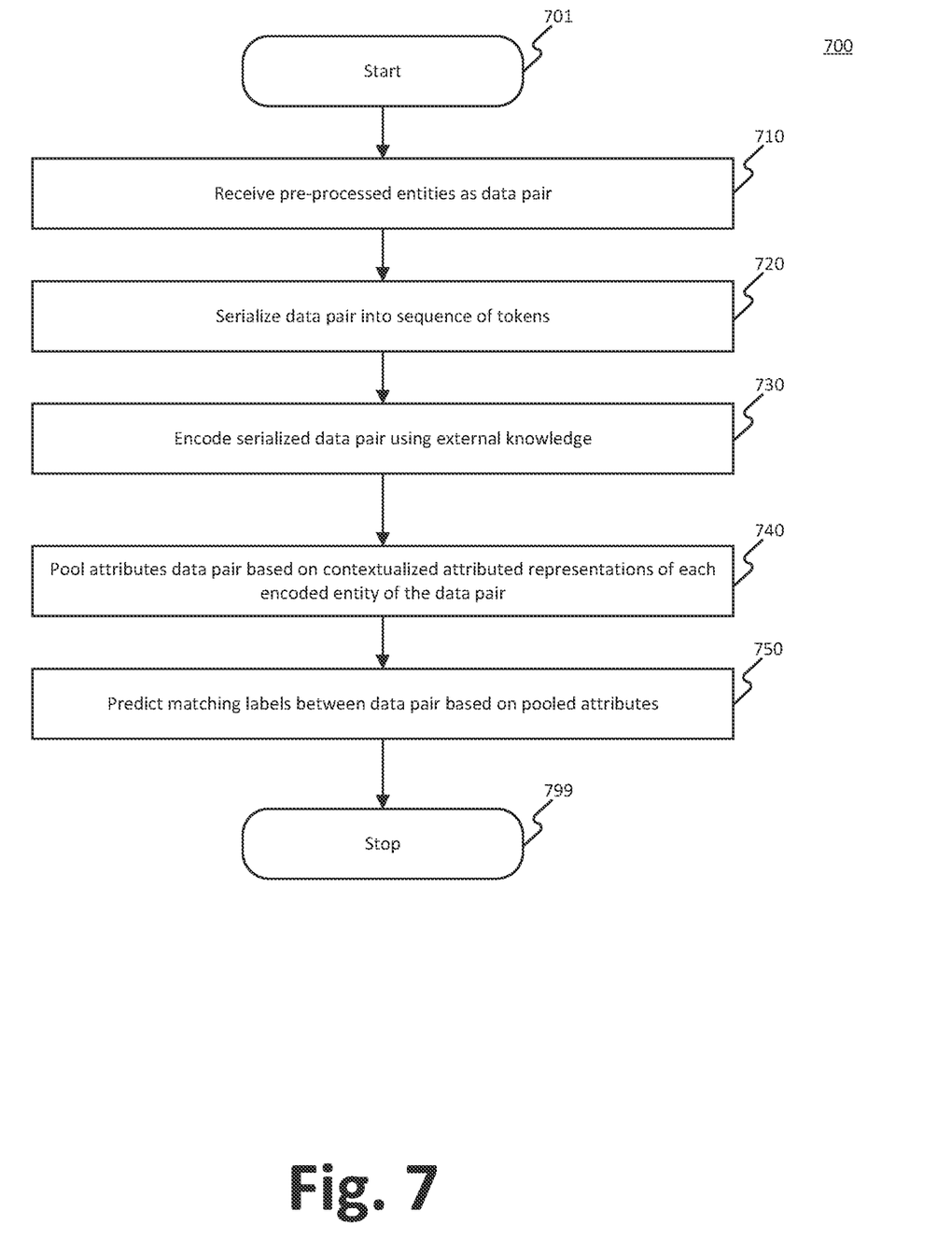
FIG. 7 is a flowchart showing an exemplary method for predicting a match between a pair of entities using a generalized entity system, consistent with embodiments of the present disclosure.

FIG. 7 is a flowchart showing an exemplary method for predicting matches between a pair of entities using a generalized entity system, consistent with embodiments of the present disclosure. The steps of method 700 can be performed by, for example, generalized entity matching system 100 of FIG. 1 executing on or otherwise using the features of computing device 500 of FIG. 5 for purposes of illustration. It is appreciated that the illustrated method 700 can be altered to modify the order of steps and to include additional steps.

In step 710, generalized entity matching system (GEM) 100 may receive pre-processed entities as a data pair over a network (e.g., network 150 of FIG. 1) to identify matched entities. In some embodiments, GEM 100 may need to generate data pair of entities before the matching step and include them as candidate pairs (e.g., candidate pairs 231 of FIG. 2) for identifying matched entities. In some embodiments, GEM 100 may pre-process entity data using data processors, such as processor 110. A detailed description of various components of processor 110 used to pre-process entity data are presented in FIG. 1 description above.

In step 720, GEM 100 may serialize a data pair into a sequence of tokens. A sequence of tokens may include specialized tags such as "[COL]" and "[VAL]" as presented in FIG. 4 description above.

In step 730, GEM 100 may encode a serialized data pair using external knowledge. External knowledge (e.g., domain knowledge 242 and structural knowledge 243) may provide structure to entity information to help find matched entities. GEM 100 may use structured entities to find matches using keywords and attributes associated with an entity and use it to find matches. A detailed description of injecting external knowledge is provided in FIG. 2 description above.

In step 740, GEM 100 may pool attributes of a data pair based on contextualized attribute representations of each encoded entity of data pair. Pooling attributes may aid in aligned attributes in entities of data pair used to identify matched entities. GEM 100 may use pooling layer 123 to find aligned attributes in different manners based on the entity type. For example, pooling layer 123 may verify if the type of entities in data pair match or not to use different pooling operators as part of pooling layer 123. A detailed description of different pooling operators used by GEM 100 is provided in FIGS. 6A-B descriptions above.

In step 750, GEM 100 may predict matching labels between a data pair based on pooled attributes using output layer 124. GEM 100 may predict whether or not entities in data pair match using "Yes" or "No" labels. In some embodiments, GEM 100 may use labels to predict names of portions of entities in data pairs that match. In some embodiments, predicted labels may indicate how well the labels of a data pair match each other. For example, predicted labels may be an integer in the range of 1 to 5, indicating the level of match between the labels.

GEM 100, upon completion of step 750, completes (step 799) executing method 700 on computing device 500.

Figure 8:
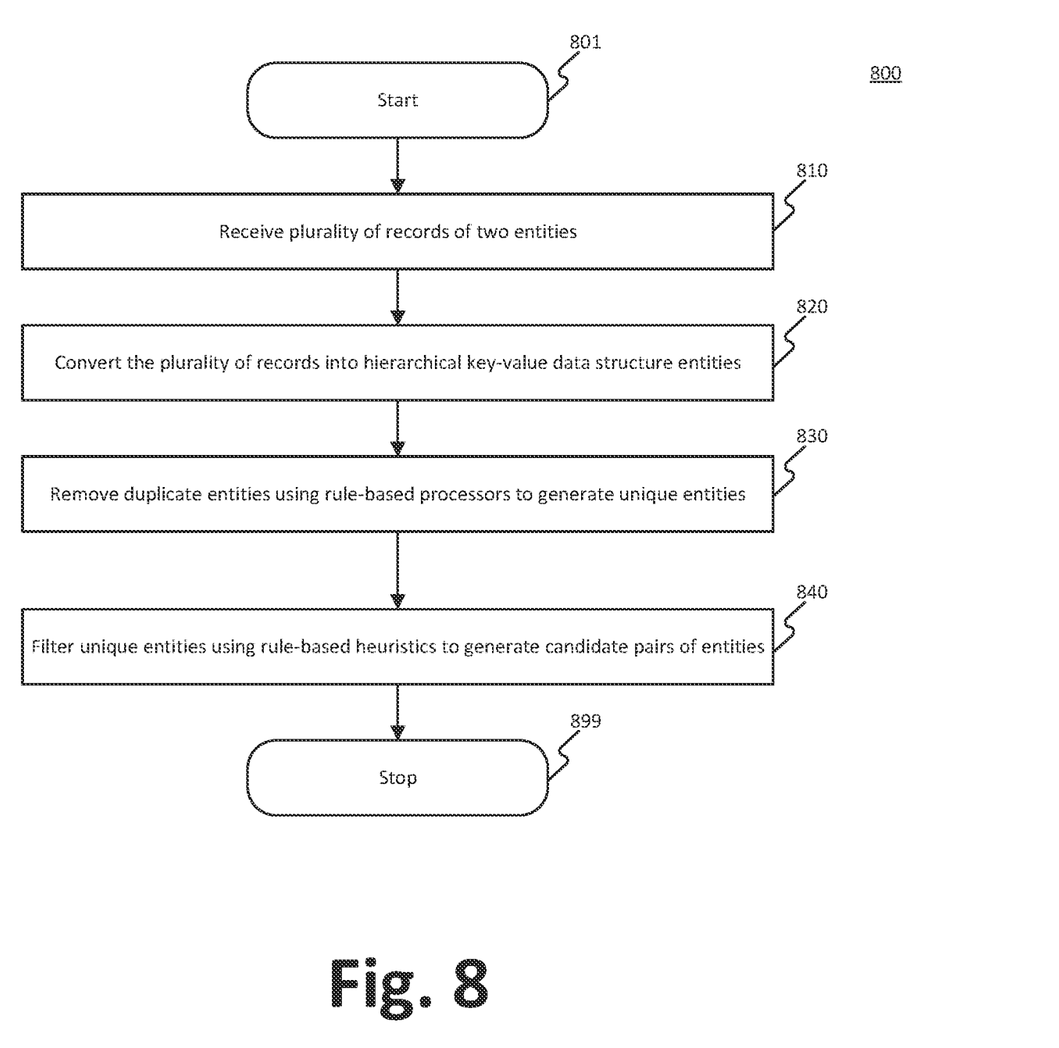
FIG. 8 is a flowchart showing an exemplary method for pre-processing data, consistent with embodiments of the present disclosure.

FIG. 8 is a flowchart showing an exemplary method for pre-processing data, consistent with embodiments of the present disclosure. The steps of method 800 can be performed by generalized entity matching system 100 of FIG. 1 executing on or otherwise using the features of computing device 500 of FIG. 5 for purposes of illustration. It is appreciated that the illustrated method 800 can be altered to modify the order of steps and to include additional steps.

In step 810, GEM 100 may receive a plurality of records of two entities. GEM 100 may receive records in the form of documents (e.g., PDF files of resume or HTML pages of Job postings) or database tables. GEM 100 may receive records of entities over a network (e.g., network 150 of FIG. 1) from a user (e.g., user 160). In some embodiments, GEM 100 may retrieve entity records by requesting dataset repository 140 (as shown in FIG. 1).

In step 820, GEM 100 may convert the plurality of records into hierarchical key-value data structure entities. GEM 100 may create hierarchical data structures of entities by applying a schema to information in entity records received in step 810. For example, GEM 100 may use parser 111 (as shown in FIG. 1) to parse data in records of entities to convert hierarchical data structure format entities, such as JSON formatted entities. A detailed description of parsing entities is presented in FIG. 1 description above.

In step 830, GEM 100 may remove duplicate entities using rule-based processors to generate unique entities. Rule-based processors may be part of de-duplicator 112 to remove duplicates in input entities. GEM 100 may remove duplicates to save space and be efficient. In some embodiments, GEM 100 may remove duplicates to avoid different matching results for the same entity. Rule-based processors may look for matching portions of entities identified by different attributes to identify duplicate entities. For example, GEM 100 may use both company name and job title to uniquely identify entities and find any potential duplicates that need to be removed. A detailed description of using de-duplicator 112 to remove duplicate entities is presented in FIG. 1 description above.

In step 840, GEM 100 may filter unique entities using rule-based heuristics to generate candidate pairs of entities. GEM 100 may use blocker 113 and sampler 114 to filter entities that are not considered as candidate pairs (e.g., candidate pairs 231 of FIG. 2). For example, GEM 100 filters by identifying entities whose information is not mapped to any attribute in step 820 when converting to a hierarchical data structure of entities. GEM 100 may filter entities by using keyword and attribute-based filters with rules. A detailed description of filtering unique entities is presented in FIG. 2 description above. After identifying unique entities converted into hierarchical data structure format entity pairs, GEM 100 may predict whether they can match an entity pair. GEM 100 may supply the filtered unique entity pairs as input for finding entity matches.

GEM 100, upon completion of step 840, completes (step 899) executing method 800 on computing device 500.

Example embodiments are described above with reference to flowchart illustrations or block diagrams of methods, apparatus (systems), and computer program products. It will be understood that each block of the flowchart illustrations or block diagrams, and combinations of blocks in the flowchart illustrations or block diagrams, can be implemented by computer program product or instructions on a computer program product. These computer program instructions can be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions can also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions can also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart or block diagram block or blocks.

Any combination of one or more computer readable medium(s) can be utilized. The computer readable medium can be a non-transitory computer readable storage medium. In the context of this document, a computer readable storage medium can be any tangible medium that can contain or store a program for use by or in connection with an instruction execution system, apparatus, or device.

Program code embodied on a computer readable medium can be transmitted using any appropriate medium, including but not limited to wireless, wireline, optical fiber cable, RF, IR, etc., or any suitable combination of the foregoing.

Computer program code for carrying out operations, for example, embodiments can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer, and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). The computer program code can be compiled into object code that can be executed by a processor or can be partially compiled into intermediary object code or interpreted in an interpreter, just-in-time compiler, or a virtual machine environment intended for executing computer program code.

The flowchart and block diagrams in the figures illustrate examples of the architecture, functionality, and operation of possible implementations of systems, methods, and computer program products according to various embodiments. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment can be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A generalized entity matching system comprising:
one or more memory devices storing processor executable instructions; and
one or more processors configured to execute instructions to cause the generalized entity matching system to perform operations, the operations comprising:
pre-processing to generate candidate pairs of entities, wherein the pre-processing includes:
receiving a plurality of records;
parsing the plurality of records into hierarchical key-value data structures, the hierarchical key-value data structures including attributes presented as keywords mapped to one or more portions of information;
removing duplicate ones of the hierarchical key-value data structures to generate unique entities;
identifying particular pairs of entities from the unique entities using the attributes presented as keywords to generate the candidate pairs of entities; and
filtering the candidate pairs of entities using rule-based heuristics;
serializing the candidate pairs of entities using predetermined tokens, wherein the serializing is based on the hierarchical key-value data structures;
encoding the serialized candidate pairs of entities including the attributes to generate vectors representing each of the predetermined tokens, wherein the attributes are associated with one or more classifiers, wherein the serialized candidate pairs of entities are concatenated;
pooling particular ones of the attributes based on the one or more classifiers and a schema associated with the candidate pairs of entities, the pooling including determining a pooling score, between two of the vectors for each of the attributes, to identify matching entities; and
training a machine learning model using at least one of structural knowledge or domain knowledge, wherein the trained machine learning model predicts matching labels between the candidate pairs of entities based on the pooled attributes.

2. The generalized entity matching system of claim 1, wherein serializing includes:
concatenating two serialized entities of the candidate pairs of entities to generate a feature vector provided as input to an encoder.

3. The generalized entity matching system of claim 1, wherein serializing includes:
providing a serialized entity for each of the candidate pairs of entities as a feature vector to an encoder.

4. The generalized entity matching system of claim 1, wherein pooling includes:
calculating an element-wise product between values of each attribute of the candidate pairs of entities, wherein the candidate pairs of entities share the same schema of attributes; and
concatenating the element-wise product of each attribute.

5. The generalized entity matching system of claim 1, wherein pooling includes operations comprising:
applying a max-pooling operator between values of the candidate pairs of entities to generate max matching scores of the attributes, wherein the candidate pairs of entities have different schemas of attributes; and
concatenating the max matching scores of the attributes.

6. The generalized entity matching system of claim 1, the operations further comprising:
providing an explanation of a match using attribute level explanations by:
determining a Euclidean distance between each attribute in a first entity of the candidate pairs of entities and each attribute in a second entity of the candidate pairs of entities; and
listing the attributes which caused the match or the attributes which caused no match based on the Euclidean distance.

7. The generalized entity matching system of claim 1, wherein predicting matching labels includes:
filtering the candidate pairs of entities with non-related entities, wherein the candidate pairs of entities include different types of entities; or
filtering the candidate pairs of entities with non-matched entities, wherein the candidate pairs of entities include a same entity type.

8. The generalized entity matching system of claim 1, the operations further comprising presenting a user interface for receiving external knowledge from a user.

9. The generalized entity matching system of claim 8, the operations further comprising providing the external knowledge to the trained machine learning model, wherein the trained machine learning model changes the hierarchical key-value data structures based on the external knowledge.

10. The generalized entity matching system of claim 1, wherein the one or more portions of information include a table having one or more rows and one or more columns.

11. The generalized entity matching system of claim 10, the operations further comprising converting each row of the table by using one or more additional tokens to represent each column name and each row value.

12. A method performed by a system for predicting matching between entities utilizing a generalized entity matching system, the method comprising:
pre-processing to generate candidate pairs of entities, wherein the pre-processing includes:
receiving a plurality of records;
parsing the plurality of records into hierarchical key-value data structures, the hierarchical key-value data structures including attributes presented as keywords mapped to one or more portions of information;
removing duplicate ones of the hierarchical key-value data structures to generate unique entities;
identifying particular pairs of entities from the unique entities using the attributes presented as keywords to generate the candidate pairs of entities; and
filtering the candidate pairs of entities using rule-based heuristics;
serializing the candidate pairs of entities using predetermined tokens, wherein the serializing is based on the hierarchical key-value data structures;
encoding the serialized candidate pairs of entities including the attributes to generate vectors representing each of the predetermined tokens, wherein the attributes are associated with one or more classifiers, wherein the serialized candidate pairs of entities are concatenated;
pooling particular ones of the attributes based on the one or more classifiers and a schema associated with the candidate pairs of entities, the pooling including determining a pooling score, between two of the vectors for each of the attributes, to identify matching entities; and
training a machine learning model using at least one of structural knowledge or domain knowledge, wherein the trained machine learning model predicts matching labels between the candidate pairs of entities based on the pooled attributes.

13. The method of claim 12, wherein pooling includes:
calculating an element-wise product between values of each attribute of the candidate pairs of entities, wherein the candidate pairs of entities share the same schema of attributes; and
concatenating the element-wise product of each attribute.

14. The method of claim 12, wherein pooling includes:
applying a max-pooling operator between values of the candidate pairs of entities to generate max matching scores of the attributes, wherein the candidate pairs of entities have different schemas of attributes; and
concatenating the max matching scores of the attributes.

15. A non-transitory computer readable medium including instructions that are executable by one or more processors to cause a system to perform a method for matching between entities, the method comprising:
pre-processing to generate candidate pairs of entities, wherein the pre-processing includes:
receiving a plurality of records;
parsing the plurality of records into hierarchical key-value data structures, the hierarchical key-value data structures including attributes presented as keywords mapped to one or more portions of information;
removing duplicate ones of the hierarchical key-value data structures to generate unique entities;
identifying particular pairs of entities from the unique entities using keywords and attributes to generate the candidate pairs of entities; and
filtering the candidate pairs of entities using rule-based heuristics;
serializing the candidate pairs of entities using predetermined tokens, wherein the serializing is based on the hierarchical key-value data structures;
encoding the serialized candidate pairs of entities including the attributes to generate vectors representing each of the predetermined tokens, wherein the attributes are associated with one or more classifiers, wherein the serialized candidate pairs of entities are concatenated;
pooling particular ones of the attributes based on the one or more classifiers and a schema associated with the candidate pairs of entities, the pooling including determining a pooling score, between two of the vectors for each of the attributes, to identify matching entities; and
training a machine learning model using at least one of structural knowledge or domain knowledge, wherein the trained machine learning model predicts matching labels between the candidate pairs of entities based on the pooled attributes.

16. The non-transitory computer readable medium of claim 15, wherein pooling includes:
calculating an element-wise product between values of each attribute of the candidate pairs of entities, wherein the candidate pairs of entities share the same schema of attributes; and
concatenating the element-wise product of each attribute.

17. The non-transitory computer-readable medium of claim 15, wherein pooling includes:
applying a max-pooling operator between values of the candidate pairs of entities to generate max matching scores of the attributes, wherein the candidate pairs of entities have different schemas of attributes; and
concatenating the max matching scores of the attributes.

* * * * *